Feb. 24, 1931.   M. E. SIMON ET AL   1,793,970
APPARATUS FOR IDENTIFYING ELEMENTS
Filed July 14, 1925
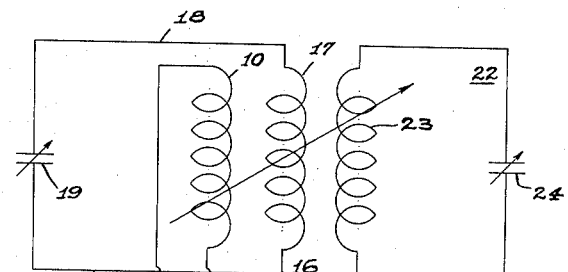
FIG.1.
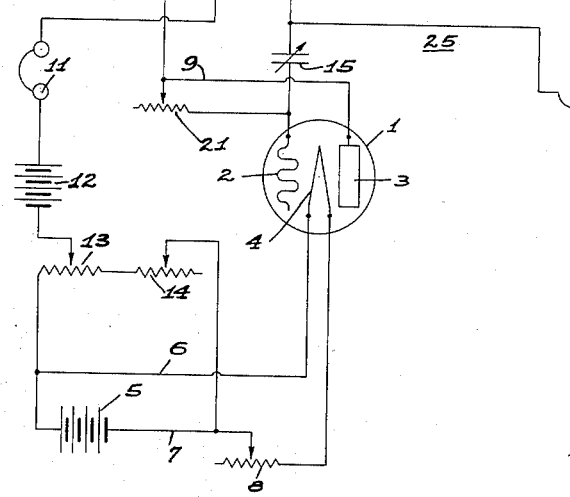
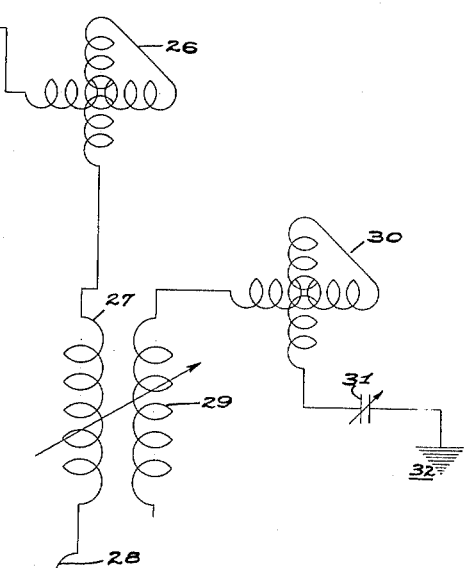
FIG.2.
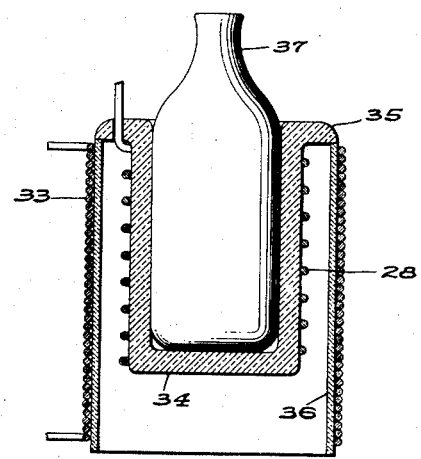
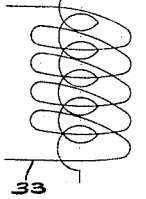
INVENTORS
MARTIN E. SIMON
JOHN A. O'CONNOR
BY White & ?
their ATTORNEYS Patented Feb. 24, 1931

1,793,970

UNITED STATES PATENT OFFICE

MARTIN E. SIMON, OF SAN FRANCISCO, AND JOHN A. O'CONNOR, OF BERKELEY, CALIFORNIA; SAID O'CONNOR ASSIGNOR TO SAID SIMON

APPARATUS FOR IDENTIFYING ELEMENTS

Application filed July 14, 1925. Serial No. 43,649.

This invention relates generally to the detection of various substances by electrical means. By substances the applicants include different chemical elements, organic or inorganic compounds, and biological organisms.

It is an object of this invention to distinguish or differentiate between substances having different characteristics by bringing them successively into active relationship with an electrical control circuit which is caused to effect an electrical response circuit.

It is a further object of our invention to provide means whereby such an element may be identified, or the presence of such an element, when mixed with other elements, may be detected. For example, our invention may be used for discovering the presence of or identifying germs, including live and dead germs, altho we do not limit our invention to this particular use, since we have been able to identify and to detect any element, using such term in the broad sense above defined, such for example, as poisons, and after a device embodying our invention has once been adjusted for a particular element, we have found it to function efficiently whether the particular element was isolated or in a mixture.

In carrying out our invention, we employ an electrical system including a response circuit associated with a control circuit and the system is critically adjusted so that a characteristic response is produced when a particular substance is brought in active relationship with the control circuit. For example, we place a known substance, which is the substance we wish to distinguish in the unknown matter, in electrostatic relation with our control circuit and adjust the response circuit to a balanced condition, that is, on the point of oscillation. We may then suppress the normal oscillations, so that there is no sound heard in the loud speaker or telephones, and we disturb this condition whenever an element for which the circuit is tuned is placed in electrostatic relation with said circuit. In this manner, the particular element may be detected by an audible signal in the loud speaker. On the other hand, we may adjust the circuit just on or below the critical point at which the same will cause normal oscillations when a given element is brought into electrostatic relation with the circuit. In either case, the result is the same, that is to say, normal oscillations are prevented or suppressed except at such times when the element for which the circuit is adjusted is brought into electrostatic relation with the same. In other words, a balanced condition is created which is unbalanced by the particular element in the manner described. When we refer to normal oscillations, we refer to those oscillations which create an audible signal in the telephones. We of course do not limit ourselves to audible signals, as other signaling means may be employed, such for example, as an oscillograph, a galvanometer, and the like. Nor do we limit ourselves to either of the methods of tuning the circuits. We desire to point out that the underlying principles or causes of the phenomena we produce are not fully understood and we do not undertake to define the same at this time. We make but one assertion at this time, based on observations from many tests covering a long period of time, namely, that the cause of the phenomena apparently is to be found in the constitution of the elements, and possibly electronic emanations therefrom. We have been able to detect the presence of matter that could not be differentiated by the microscope.

The invention possesses other advantageous features, some of which with the foregoing will be set forth at length in the following description, where we shall outline in full that form of the invention which we have selected for illustration in the drawings accompanying and forming part of the present specification. In said drawings we have shown one form of device embodying our invention, but it is to be understood that we do not limit ourselves to such form, since the invention, as set forth in the claims, may be embodied in a plurality of other forms.

Referring to the drawings:

Figure 1 is a diagram of an electric circuit embodying our invention; and

Fig. 2 is a vertical sectional view of one form of means employed for bringing the element under examination into electrostatic relation with the control circuit.

Referring to the drawing the response circuit comprises an electron emission tube 1 having a grid 2, plate 3, and filament 4. The filament 4 is connected with an A battery 5 by means of conductors 6 and 7 and a variable resistance 8 is provided in said circuit controlling the filament. The plate 3 is connected by means of a conductor 9 with one end of an untuned inductance coil 10 and the opposite end of said coil is connected with telephone 11, B battery 12 and potentiometer 13. The potentiometer 13 is in series with a variable resistance 14 and both are connected across the filament circuit comprising conductors 6 and 7. The grid 2 is connected through a variable condenser 15 with a tuned circuit 16 comprising an inductance coil 17, conductor 18, tuning condenser 19 and conductor 20. A variable resistance 21 is connected across the grid and plate circuits between conductors 9 and grid 2. An independent tuned circuit 22 comprising an inductance coil 23 and a tuning condenser 24 is also provided. The coils 10, 17 and 23 are inductively coupled together and variable. The elements thus far describe a regenerative or oscillatory circuit which may be tuned in a well-understood manner.

Connected to the grid circuit, preferably between the grid condenser 15 and the tuned circuit 16 is the control circuit 25 comprising preferably a variometer 26, inductance coil 27 and inductance coil 28 which are connected in series in the order enumerated. A coil 29 is variably coupled with the coil 27 and at one end is connected with a variometer 30 in series with a condenser 31 which leads to the ground 32. The opposite end of coil 29 is free. An openended coil 33 surrounds the coil 28.

As shown in Fig. 2, the coil 28 is loosely wound around an insulated container 34, preferably glass, which is provided with a flange 35 at its upper end. The container 34 is suspended by its flange 35 within an insulated tube 36 of larger diameter. The open coil 33 is tightly wound on the tube 36.

The operation of our invention is as follows: We place an element of the kind we desire to identify in a suitable vial 37, and position the vial within the container 35 as shown in Fig. 2. We next tune the circuit to the point of oscillation, that is, at a point at which an audible characteristic signal or response is produced in the telephones while the vial 37 is in the container 35, and which signal ceases when the vial 37 is removed from said container. If another vial containing an unknown substance is placed within the container the characteristic response will not be produced unless the second substance includes substance present in the first vial. It may be said that we have balanced the circuit, or placed it in a state of equilibrium with respect to the particular element, so far as normal oscillations, as above defined, are concerned. In other words, we have tuned our circuit to produce normal oscillations responsive to an electrostatic condition introduced by a given element, or for other causes unknown. Regardless of the exact nature of what has taken place, we know that we have prevented or suppressed the normal oscillations, and the same are caused or released only by the electrostatic introduction of the given element into the circuit. Therefore, when we speak of having suppressed the normal oscillations, we desire to be understood as having created a condition in the circuit at which the audible or normal oscillations take place when a given element is brought into electrostatic relation with the circuit, and which oscillations cease when said element is removed from said relation. When properly adjusted, our apparatus does not respond or produce normal oscillations, when any other element than the one to which it is tuned is introduced into the circuit. We have not as yet been able to determine which of the several variable elements in the circuit controls the phenomena we secure. This may be due to one element or to the combination of several or all of them. In some instances, the circuit may be adjusted by means of the resistance 21 alone, in others by means of several of the variable condensers and coils, and still in others by adjusting every variable element in the entire circuit. It will be observed, however, that in each instance, we control the grid potential by bringing the particular element into electrostatic relation with said circuit.

We claim:

1. In a device for differentiating substances, a response circuit, a control circuit cooperably associated with the response circuit, means for establishing a definite active relationship between said control circuit and said substance to be differentiated, and a grounded reactive circuit electrically associated with the control circuit.

2. In a device for differentiating substances, a response circuit, a control circuit cooperably associated with the response circuit, means for establishing a definite active relationship between said control circut and said substance to be differentiated, and a grounded reactive circuit electrically associated with the control circuit, the reactance of said last named circuit being adjustable.

3. Apparatus for differentiating substances comprising a response circuit, an electron relay in said circuit having control, cathode and anode elements, a control circuit associated with said response circuit and adapted to be in active relationship with a substance to be differentiated, and an adjustable resistance connected between the control electrode and one of the other elements of said relay; means for critically adjusting said resistance to produce an audio frequency current in the response circuit when one particular substance is in active relationship with the control circuit.

4. Apparatus for differentiating substances comprising an electron relay having intercoupled grid and anode circuits, a control circuit associated with said relay circuits means for receiving a sample of a substance in definite active relationship with the control circuit, and means for critically adjusting the relay circuits until a characteristic pulsating current of audio frequency is caused to flow in the anode circuit of the relay when one particular substance is placed in said active relationship with the control circuit, but so that no such characteristic current pulsations will flow when other substances are placed in such active relationship with the control circuit.

5. In a device for differentiating substances, a response circuit, a control circuit, and means for establishing a definite active relationship between a substance to be differentiated and the control circuit comprising a coil connected to the control circuit and within which the substance is positioned, and a coil surrounding said first coil in independent relation to either circuit.

6. In a system for distinguishing between substances a self-excited oscillatory response circuit utilizing a three element electron relay, an associated control circuit provided with means adapted for influence thereon by the proximity of the substance to be distinguished to thereby affect a signal in the response circuit, said response circuit including an adjustable resistance between the plate and the grid of said electron relay.

7. Apparatus for distinguishing between species of non-metallic substances, comprising associated electrical circuits including means for causing oscillations therein, means for adjusting the circuits one to the other whereby an audio frequency may be manifested in one of the circuits, and means in one of said circuits adapted for influence thereon by the proximity of a non-metallic substance to be distinguished to thereby disturb the adjustment of the circuits and a note produced by said audio frequency.

8. Apparatus for distinguishing between species of substances, comprising associated electrical circuits including a self-excited oscillatory response circuit, means for adjusting the circuits one to the other whereby an audio frequency may be manifested in the responses circuit, and means in one of said circuits adapted for influence thereon by the proximity of a substance to be distinguished to thereby disturb the adjustment of the circuits and a note produced by said audio frequency.

In testimony whereof, we have hereunto set our hands.

MARTIN E. SIMON.
JOHN A. O'CONNOR.